United States Patent [19]
Nortenius

[11] Patent Number: 5,325,659
[45] Date of Patent: Jul. 5, 1994

[54] S/Z CABLING MACHINE FOR LAYING FIBERS AROUND A GROOVED PULL-RELIEVER

[75] Inventor: Bengt A. Nortenius, Hudiksvall, Sweden

[73] Assignee: Telefonaktiebolaget L M Ericsson, Stockholm, Sweden

[21] Appl. No.: 105,686

[22] Filed: Aug. 13, 1993

Related U.S. Application Data

[62] Division of Ser. No. 690,294, Apr. 24, 1991, Pat. No. 5,259,180.

[30] Foreign Application Priority Data

May 21, 1990 [SE] Sweden ................................ 9001827

[51] Int. Cl.⁵ .......................... H01B 13/02; G02B 6/10
[52] U.S. Cl. .............................................. 57/293; 57/3;
57/6; 57/264; 57/314; 57/352; 57/361
[58] Field of Search ................. 57/3, 6, 264, 293, 314, 57/352, 361

[56] References Cited

U.S. PATENT DOCUMENTS

| | | | |
|---|---|---|---|
| 4,205,899 | 6/1980 | King et al. | 57/6 |
| 4,388,799 | 6/1983 | Vives | 57/6 |
| 4,497,164 | 2/1985 | Dotti et al. | 57/6 |
| 4,587,801 | 5/1986 | Missout et al. | 57/6 |
| 4,676,054 | 6/1987 | In't Veld | 57/6 |
| 4,805,395 | 2/1989 | Seveso et al. | 57/13 |
| 4,825,629 | 5/1989 | Missout et al. | 57/6 |
| 4,833,871 | 5/1989 | Ogawa et al. | 57/6 |
| 4,856,266 | 8/1989 | Ogawa et al. | 57/3 X |
| 4,939,896 | 7/1990 | Blew | 57/293 |
| 4,974,408 | 12/1990 | Karmo | 57/314 X |

FOREIGN PATENT DOCUMENTS

| | | |
|---|---|---|
| 108850 | 11/1982 | European Pat. Off. |
| 168278 | 5/1985 | European Pat. Off. |

*Primary Examiner*—Daniel P. Stodola
*Assistant Examiner*—William Stryjewski
*Attorney, Agent, or Firm*—Burns, Doane, Swecker & Mathis

[57] ABSTRACT

A cabling machine for laying optofibers, cables or the like in an oscillating, wavy path around a smooth pull-reliever, or into grooves having an oscillating, wavy shape which are extruded around a pull-reliever, i.e., so-called S/Z-cabling. The machine includes a pull-reliever pulling-off device, a braking capstan, a fiber reeling-off device, and an S/Z-bench (6) for laying the fibers around the pull-reliever. When used with a grooved pull-reliever (2), a laying-on tube (11) of the S/Z bench (6) is connected to a transmission (14), and a sensor (17) is connected to the transmission and functions to detect rotation of the laying-on tube (11) caused by the oscillating waveshape of the grooves. The reeling-off device (1) and the braking capstan (3) are controlled to cause the pull-reliever (2) to rotate to perform a corrective function.

6 Claims, 3 Drawing Sheets

S/Z CABLING MACHINE FOR LAYING FIBERS AROUND A GROOVED PULL-RELIEVER

This is a divisional of application Ser. No. 07/690,294, filed Apr. 24, 1991, now U.S. Pat. No. 5,259,180.

BACKGROUND OF THE INVENTION

1. Field of the Invention

The present invention relates to a cabling machine, more particularly to laying optofibers, cables or the like in an oscillating wavy path around a smooth pull-reliever, or down into grooves of oscillating waveshape that have been extruded around a pull-reliever, as in so-called S/Z-cabling.

2. Description of Related Art

Cabling machines for laying optofibers or the like in an oscillating, wavy path around a smooth pull-reliever are known to the art. These cabling machines include an S/Z-bench which includes a laying-on tube or discs which are oscillated backwards and forwards for the purpose of laying the fibers on the pull-reliever. The fibers, which pass along the laying-on tube to a laying-on head located on the forward end of said tube, become wound to a greater or lesser extent around the laying-on tube during operation of the machine, which causes the fibers to be subjected to friction forces. These frictional forces will vary in accordance with the rotational movement of the laying-on tube at that particular moment in time, and when the fibers are wound to a great extent on the tube, the frictional forces can be so high as to damage the fibers.

Also known to the art are cabling machines which are intended to lay optofibers or the like in grooves of oscillating waveform extruded around a pull-reliever. These machines also include an S/Z-bench provided with a laying-on tube or discs over which the fibers pass to a laying-on head. The pull-reliever is pulled rectilinearly through the laying-on tube and, because of the oscillating form of the grooves, the tube tends to rotate forwards and backwards as a result of the fibers being guided down into the grooves. This rotational movement or twisting of the laying-on tube will also cause fibers to be wound around the tube and subjected to frictional forces that are liable to damage the fibers, similar to the former case.

Thus, the known cabling machines have the disadvantage of subjecting fibers to large frictional forces with subsequent risk of damage to the fibers. Furthermore, the known machines are intended for laying fibers in an oscillating waveform, i.e. S/Z-cabling, solely on one type of pull-reliever, namely either on a smooth pull-reliever or on a pull-reliever on which grooves have been pre-extruded.

OBJECTS AND SUMMARY OF THE INVENTION

The object of the present invention is to provide a cabling machine which will not subject the fibers to harmful frictional forces and which can also be readily switched between modes in which fibers can be laid on both smooth and grooved pull-relievers. The above objects as well as other objects not specifically enumerated are accomplished by a cabling machine in accordance with the present invention. A cabling machine of the present invention for laying a fiber in an oscillating waveform around a smooth pull-reliever includes a pull-reliever reeling-off device, a braking capstan, a fiber reeling-off device, an S/Z-bench for laying the fiber around the pull-reliever, a yarn spinner for fixating the fiber on the pull-reliever, and a wheel capstan and a taking-up device for forwardly pulling and taking-up the finished cable, respectively, said S/Z-bench including a laying-on tube provided with a laying-on head, wherein the fiber passes over the laying-on tube up to and through a hole in the laying-on head, where it is laid on the pull-reliever and fixated with yarn taken from said yarn spinner, wherein said S/Z-bench includes an aligning mechanism which grips and guides the pull-reliever, and a motor which drives the aligning mechanism in an oscillatory rotational movement through a transmission, wherein said laying-on tube is connected to said transmission such that an oscillatory, rotational movement is imparted to said laying-on tube by said transmission in a direction opposite to the rotational movement of said aligning mechanism, wherein a sensor is connected to said transmission and controls the rotational movement of said motor and therewith the rotational movement of said laying-on tube and said aligning mechanism and wherein rotational movement of said laying-on tube is limited such that the fiber will only be wound on said laying-on tube to a slight extent, so as to minimize the frictional forces acting on said tube.

The objects of the invention are also accomplished by a cabling machine for laying a fiber into an oscillating, waveshape groove extruded around a pull-reliever, which includes a pull-reliever reeling-off device, a braking capstan, a fiber reeling-off device, an S/Z-bench for laying the fiber around the pull-reliever, a yarn spinner for fixating the fiber on the pull-reliever, and a wheel capstan and a taking-up device for forwardly pulling and taking-up the finished cable, respectively, said S/Z bench including a laying-on tube provided with a laying-on head, wherein the fiber passes over said laying-on tube up to and through a hole in said laying-on head, where it is laid on the pull-reliever and fixated with yarn taken from said yarn spinner, wherein said pull-reliever reeling-off device and said braking capstan are rotatably mounted, wherein said laying-on tube is freely rotatable and is guided by the action of laying the fiber into the groove in the pull-reliever, wherein said laying-on tube and a sensor are connected to said transmission, and wherein said sensor functions to detect rotation caused by the oscillating, waveshape of the groove in said laying-on tube and causes said reeling-off device and said braking capstan to rotate and perform a correction function which counteracts excessive rotation or twisting of said laying-on tube, such that the groove in the pull-reliever in the vicinity of said laying-on head will extend substantially rectilinearly and such that the fiber will extend substantially parallel with said laying-on tube in the absence of friction thereagainst.

The inventive cabling machine has the advantage of being usable for both types of pull-reliever and also of minimizing the risk of damage to the fibers, since the fibers pass over the laying-on tube in a frictionless fashion. This enables the fibers to be laid at a high production rate.

Further objects of the inventive cabling machine and further advantages afforded thereby will be evident from the following, detailed description, in which the invention is described in more detail with reference to a preferred exemplifying embodiment thereof and also with reference to the accompanying drawings.

BRIEF DISCLOSURE OF THE DRAWINGS

DETAILED DESCRIPTION

Figure 1:
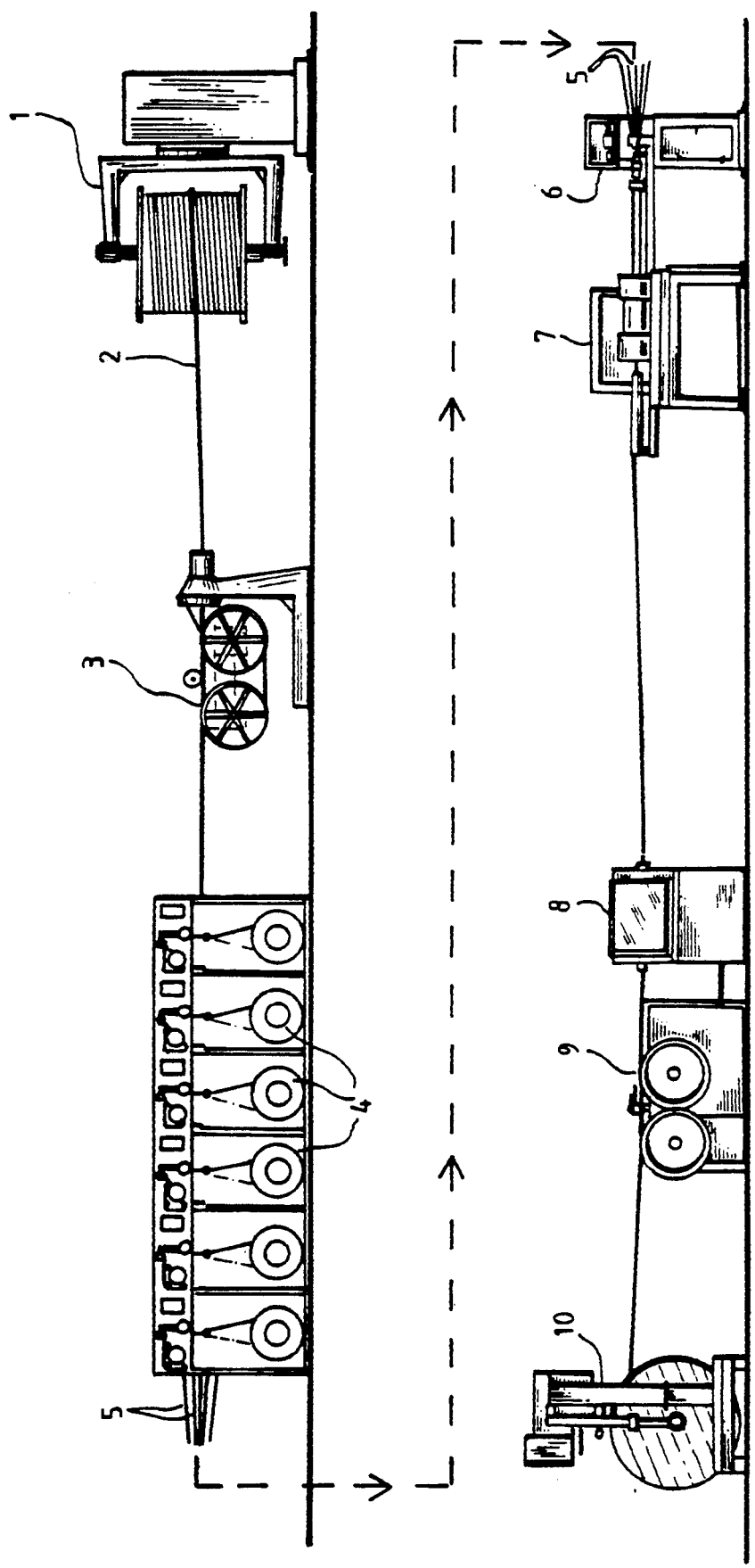
FIG. 1 is a schematic front view of a cabling machine of the invention.

FIG. 1 illustrates schematically the general construction of a cabling machine. The illustrated machine includes a reeling-off device 1 for reeling-off a pull-reliever 2, a braking capstan 3, unreeling devices 4 for reeling-off fibers 5 which are to be laid around the pull-reliever 2, an S/Z-bench 6, a yarn spinner 7 which is located immediately downstream of the S/Z-bench and which functions to fix the fibers on the pull-reliever, optionally a banding machine 8 or banding the fiber-laid cable to a finished cable, a wheel capstan 9 for drawing the cable forwards, and a coiling device 10 for coiling-up the finished cable. The reeling-off device 1 is provided with a basic braking arrangement, and the braking capstan 3 is provided with sensors for determining and setting the tension in the pull-reliever 2, this being necessary so as to obtain a sufficient fiber surplus which will enable the temperature-cycling requirement to be fulfilled. Both the reeling-off device 1 and the braking capstan 3 are rotatably mounted, for reasons made apparent herebelow. The fiber reeling-off devices 4 are arranged in a common station and include, in a known manner, basic braking arrangements, forwardly pulling devices and sensors for measuring and adjusting the tension in the fibers.

Figure 2:
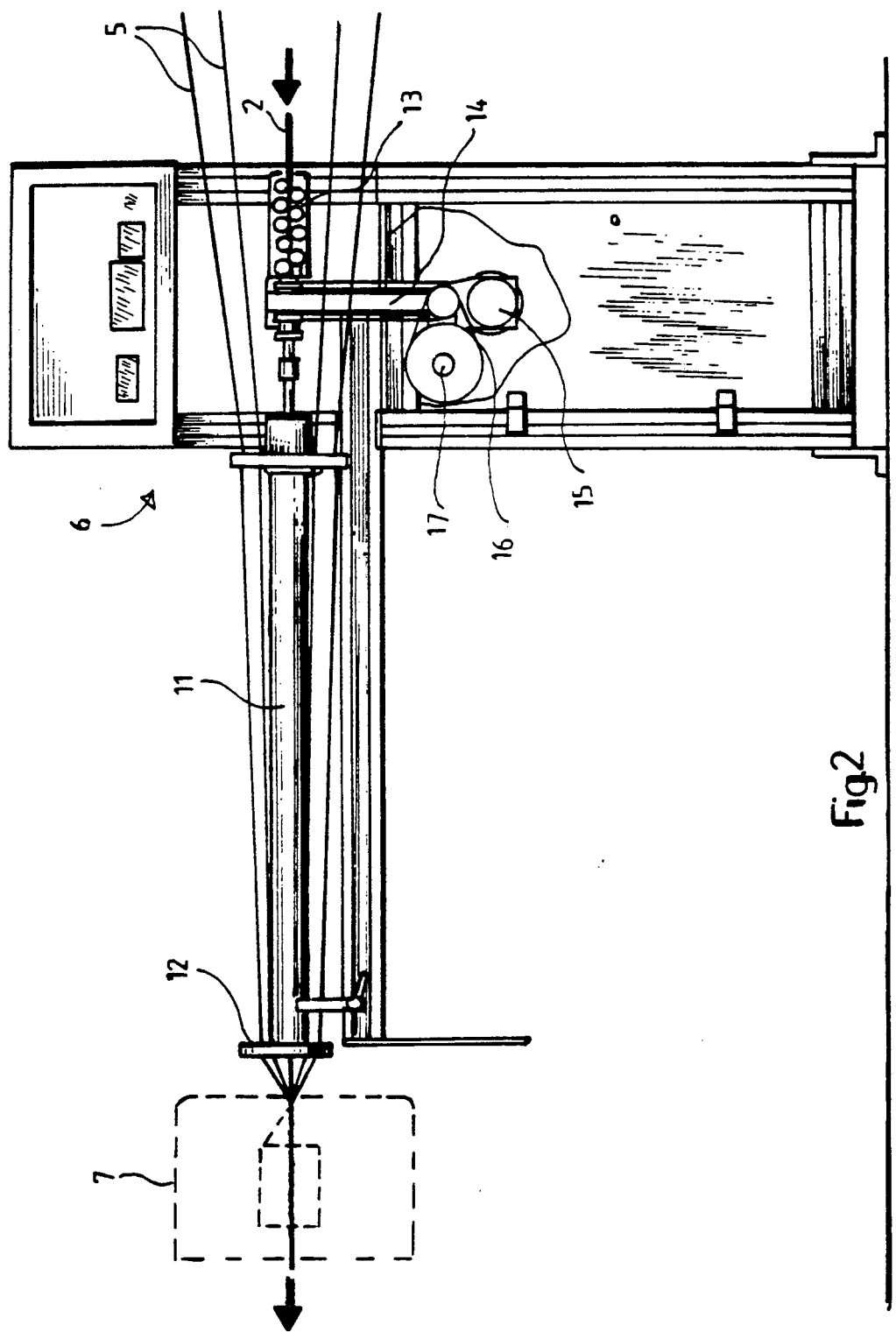
FIG. 2 is a front view of an S/Z-bench of the cabling of FIG. 1.

The S/Z-bench 6 will now be described in more detail with reference to FIG. 2. The S/Z-bench can be said to be the hub of the cabling machine and of the invention, and includes a fiber-laying-on tube 11 over which the fibers 5 pass from the reeling-off devices 4. The fibers 5 are guided to the S/Z-bench so as to be conducted concentrically over the laying-on tube 11 and up to a laying-on head 12 mounted on the outer end of the tube, where the fibers are guided and conducted down onto the pull-reliever 2 drawn through the laying-on tube. The laying-on head may be of any conventional kind and is only shown schematically in the FIG. and will not be described in detail. The S/Z-bench 6 also includes an aligning mechanism 13, a transmission 14 capable of being driven by a reversable stepping motor 15, and an absolute sensor 17 connected to the transmission over gearing 16.

Figure 3:
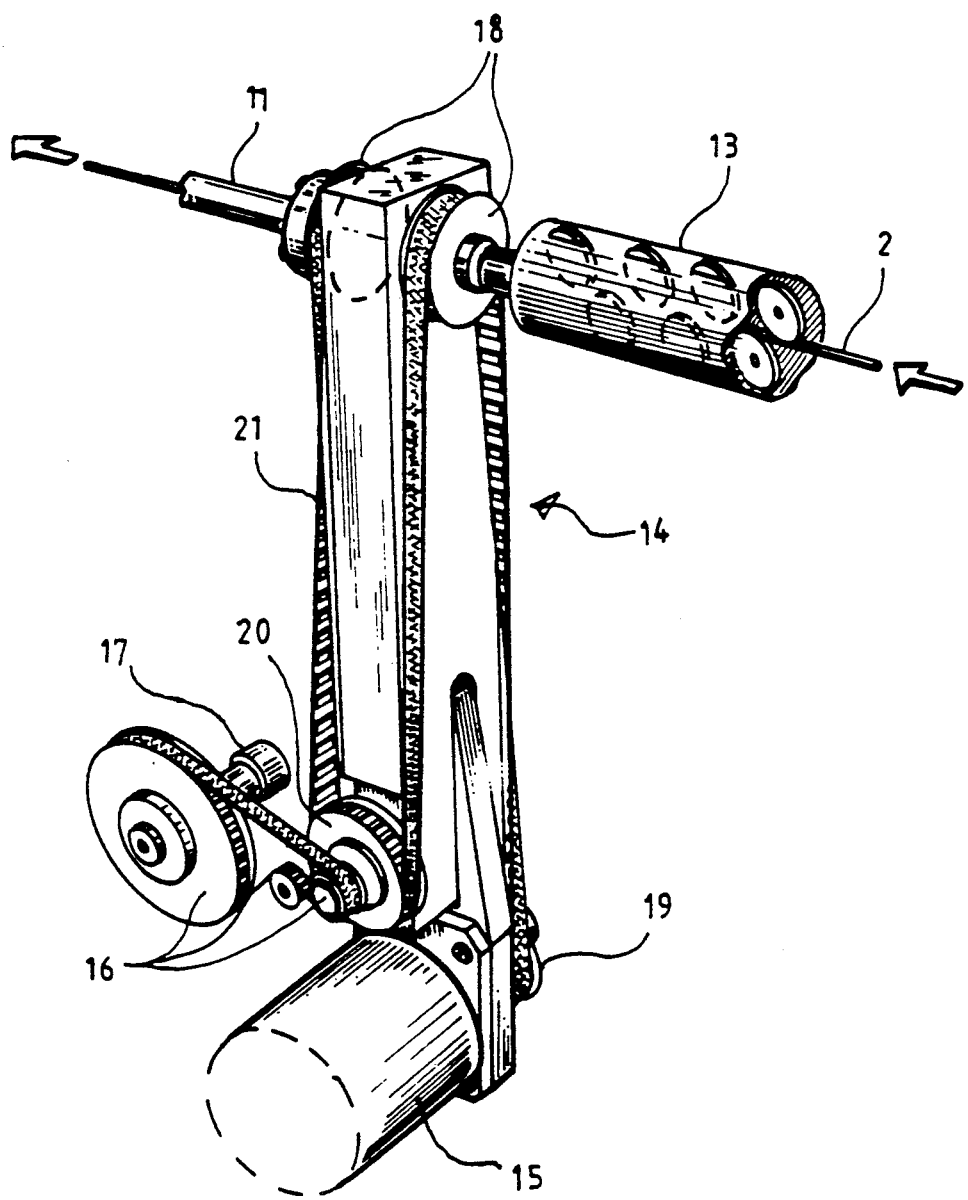
FIG. 3 is a detailed view of a transmission of the S/Z-bench of FIG. 2.

The transmission 14 is illustrated in more detail in FIG. 3. The transmission includes two toothed wheels 18 which are in mutual axial alignment and through which the pull-reliever 2 can pass. The aligning mechanism 13 can be non-rotatably connected to one toothed wheel by means of a key-joint or the like, and the laying-on tube 11 can be non-rotatably connected to the other toothed wheel. Two further toothed wheels 19 and 20 are mounted perpendicularly to and at different distances from the toothed wheels 18, of which further toothed wheels the tooth wheel 19 is connected to the motor 15 and the toothed wheel 20 is connected to the absolute sensor 17, via the gearing 16. An endless toothed belt 21 runs in a continuous loop over the toothed wheels 18, 19 and 20, the arrangement being such that when one toothed wheel 18 rotates in one direction, the other toothed wheel 18 will rotate in the opposite direction.

In the illustrated embodiment, the gearing 16 comprises a smaller toothed wheel which is connected to the toothed wheel 20 and which drives a large toothed wheel connected to the sensor 17 via a toothed belt, although it will be understood that other types of gearing can be used. The gearing is intended to prevent the absolute sensor 17 from rotating more than one revolution.

When cabling smooth pull-relievers 2, the reeling-off device 1 and the braking capstan 3 are both stationary, i.e. not rotatable. The aligning mechanism 13, which comprises a number of gripping wheels which grip around the pull-reliever 2 and guide the same through the aligning mechanism, is connected to the transmission 14. The stepping motor 15 is also connected to the transmission 14 and drives the transmission, and consequently also the aligning mechanism 13 and the pull-reliever 2, in an oscillating reciprocating rotary movement. This movement is regulated by the absolute sensor 17 via a regulating and controlling device. The fibers 5 will therefore be laid on the pull-reliever 2 in an oscillating waveform and are fixated with the aid of yarn taken from the yarn spinner 7 immediately downstream of the laying-on head 12. The yarn spinner 7 is preferably a double-yarn spinner with which the two yarns are laid in mutually opposite directions, thus in both an S-direction and a Z-direction. Because the laying-on tube 11 does not rotate when in operation, the fibers 5 will pass parallel through the tube, and hence the frictional forces acting on the fibers will be minimal.

In accordance with an alternative embodiment, for cabling a smooth pull-reliever 2, the laying-on tube 11 may also be connected to the transmission 14. Because of the configuration of the transmission, both the aligning mechanism 13 and the laying-on tube 11 will, in this case, be imparted an oscillating, reciprocating rotary movement, although in different directions. Rotation is regulated by the absolute sensor 17 also in this case. Because of these counterdirectional rotary movements, the total rotation of the aligning mechanism 13 may be smaller than in the former case, while still laying the fibers in an oscillating waveform on the pull-reliever. Total rotation of the laying-on tube 11 is equal to the total rotation of the aligning mechanism 13, therewith limiting the extent to which fibers 5 become wound around the laying-on tube 11 and thus also limiting the frictional forces on the fibers.

Cabling of grooved pull-relievers 2 will now be described. In this case, the aligning mechanism 13 is removed, the stepping motor 15 is disconnected, and the laying-on tube 11 is connected to the transmission 14. In this case, the reeling-off device 1 and the braking capstan 3 can be rotated to effect a correcting function. When the fibers 5 are laid into the oscillating, wave grooves in the pull-reliever 2, the laying-on tube 11 will tend to rotate. This rotation is detected by the absolute sensor 17 connected to the transmission 14, which now causes the reeling-off device 1 and the braking capstan 3 to rotate in a remedial or correcting fashion in response to the set turning-limits of the laying-on tube 11 such that the grooves in the pull-reliever 2 will extend substantially rectilinearly past the laying-on head 12. The laying-on tube 11 will thus only rotate or twist to a limited extent and consequently fibers 5 will not be wound onto the tube or subjected to frictional forces to any appreciable extent.

In all of the aforedescribed alternative embodiments, it must be ensured that the free length of the pull-reliever 2, i.e. the distance between the braking capstan 3 and the wheel capstan 9, is sufficiently great to enable the pull-reliever to rotate about its longitudinal axis.

It will be understood that the invention is not restricted to the aforedescribed and illustrated embodiment, and that modifications can be made within the scope of the accompanying Claims.

I claim:

1. A cabling machine for laying optofibers, cables or other elongate elements into oscillating, waveshape grooves extruded around a pull-reliever to produce a finished article comprising a pull-reliever reeling-off device for reeling-off a pull-reliever in a first direction, a braking capstan located downstream of the pull-reliever reeling-off device in the first direction, a fiber reeling-off device located downstream of the braking capstan in the first direction for reeling-off fibers, an S/Z-bench located downstream of the fiber reeling-off device in the first direction for laying the fibers around the pull-reliever, a yarn spinner located downstream of the S/Z bench in the first direction for fixating the fibers on the pull-reliever, and a wheel capstan and a taking-up device located downstream of the spinner in the first direction for forwardly pulling and taking-up the finished article respectively, said S/Z bench including a laying-on tube provided with a laying-on head so that the fibers pass over the laying-on tube up to and through holes in the laying-on head, where the fibers are laid on the pull-reliever and fixated with yarn taken from the yarn spinner located immediately downstream of the laying-on head, the pull-reliever reeling-off device and the braking capstan being rotatably mounted; the laying-on tube being freely rotatable and being guided by way of the fibers being laid into the grooves in the pull-reliever; the laying-on tube being connected to a transmission; and a sensor connected to the transmission for detecting rotation of the laying-on tube caused by the oscillating, waveshape of the grooves in the pull-reliever and for causing the reeling-off device and the braking capstan to rotate and perform a correcting function which counteracts excessive rotation or twisting of the laying-on tube such that the grooves in the pull-reliever in a vicinity of the laying-on head will extend substantially rectilinearly and such that the fibers will extend substantially parallel with the laying-on tube in the absence of friction thereagainst.

2. A cabling machine according to claim 1, wherein the transmission includes two mutually coaxial first toothed wheels through which the pull-reliever passes, two mutually parallel second toothed wheels spaced from and axially perpendicular to the first toothed wheels, and a toothed belt which extends in a continuous loop around said first and second toothed wheels, and the laying-on tube being connected to one of said first toothed wheels.

3. A cabling machine according to claim 2, wherein the sensor is an absolute sensor and is connected to the transmission via gearing.

4. A cabling machine according to claim 3, including a banding machine positioned upstream of the wheel capstan.

5. A cabling machine according to claim 4, wherein the yarn spinner is a double yarn spinner with which the two yarns are laid in mutually opposite directions.

6. A cabling machine according to claim 5, wherein a free length of the pull-reliever between the braking capstan and the wheel capstan is sufficiently long to enable the pull-reliever to rotate about its longitudinal axis.

* * * * *